(12) United States Patent
Okazaki

(10) Patent No.: US 7,961,824 B2
(45) Date of Patent: Jun. 14, 2011

(54) RECEIVER APPARATUS

(75) Inventor: Akihiro Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 909 days.

(21) Appl. No.: 11/817,527

(22) PCT Filed: Sep. 9, 2005

(86) PCT No.: PCT/JP2005/016594
§ 371 (c)(1),
(2), (4) Date: Aug. 31, 2007

(87) PCT Pub. No.: WO2006/092877
PCT Pub. Date: Sep. 8, 2006

(65) Prior Publication Data
US 2008/0181341 A1    Jul. 31, 2008

(30) Foreign Application Priority Data

Mar. 2, 2005   (JP) .................. 2005-057691

(51) Int. Cl.
*H03D 1/04*    (2006.01)
(52) U.S. Cl. ........ 375/346; 375/316; 375/340; 375/347; 375/349
(58) Field of Classification Search .................. 375/316, 375/340, 346–347, 349
See application file for complete search history.

(56) References Cited

U.S. PATENT DOCUMENTS

| | | | | |
|---|---|---|---|---|
| 6,654,431 | B1 * | 11/2003 | Barton et al. ................. | 375/346 |
| 7,113,549 | B1 * | 9/2006 | Isaksson et al. .............. | 375/285 |
| 7,254,192 | B2 * | 8/2007 | Onggosanusi et al. ........ | 375/340 |
| 7,362,832 | B2 * | 4/2008 | Yoshida ........................ | 375/348 |
| 2005/0195921 | A1 * | 9/2005 | Abe .............................. | 375/340 |

FOREIGN PATENT DOCUMENTS

| | | |
|---|---|---|
| JP | 2004 221702 | 8/2004 |
| JP | 2004 241916 | 8/2004 |
| JP | 2004 266814 | 9/2004 |
| JP | 2004 289475 | 10/2004 |
| WO | 03 039088 | 5/2003 |

OTHER PUBLICATIONS

Satoshi Suyama, et al., "A Scattered Pilot OFDM Equalizer for Multipath Environments With the Delay Difference Greater Than Guard Interval", The Institute of Electronics, Information and Communication Engineers, vol. 102, No. 204, pp. 79-84, 2002. (with English abstract).

Yoichi Maeda, et al., "A Study on Optimum Coefficient of Multi Dimensional Lattice Filter for OFDM", The Institute of Electronics, Information and Communication Engineers, vol. 100, No. 664, pp. 35-40, 2001.

Steffen Trautmann, et al., "Perfect Equalization for DMT Systems Without Guard Interval", IEEE Journal on Selected Areas in Communications, vol. 20, No. 5, pp. 987-996, 2002.

Akihiro Akazaki, et al., "Frequency Domain Equalization of Multipath Signals With Insufficient Guard Interval", The Institute of Electronics, Information and Communication Engineers, pp. 470, 2005. (with English translation).

* cited by examiner

*Primary Examiner* — Chieh M Fan
*Assistant Examiner* — Sophia Vlahos
(74) *Attorney, Agent, or Firm* — Oblon, Spivak, McClelland, Maier & Neustadt, L.L.P.

(57) ABSTRACT

A receiving apparatus includes a CE unit that estimates a propagation channel, a PG unit that reproduces a pilot signal included in the reception signal based on the estimated channel information, an EMG unit that generates, assuming that a pilot signal included in the reception signal is a null carrier, a frequency equalization matrix based on the channel information, a PR unit that subtracts the reproduced pilot signal from a result of the DFT, and an EMM unit that multiplies the frequency equalization matrix with a signal after the subtraction.

5 Claims, 8 Drawing Sheets

RECEIVER APPARATUS

TECHNICAL FIELD

The present invention relates to a receiving apparatus that employs the multi-carrier modulation system. More particularly, the present invention relates to a receiving apparatus that suppresses interference due to delayed waves in an environment there is no null carrier or there are few null carriers.

BACKGROUND ART

As radio communication systems, for example, conventionally there are known multi-carrier modulation systems represented by OFDM (Orthogonal Frequency Division Multiplexing) system and DMT (Discrete Multitone) system. These systems are employed in wireless LANs, ADSLs, and the like. These multi-carrier modulation systems insert carries, which are orthogonal, in a plurality of frequencies, and transmit the carriers. These systems are characterized by having, for example, a guard interval or a cyclic prefix as a function for removing an influence of delayed waves caused by a propagation path or the like between a transmitter and a receiver. The receiver applies FFT to an OFDM symbol, from which the guard interval has been removed, to remove influences of delayed waves in the guard interval and correctly demodulate data.

However, in the OFDM system, intersymbol interference occurs and characteristics are substantially deteriorated if delayed waves that continue even after (i.e., exceed) the guard interval arrive. This problem can be overcome by adding a guard interval longer than the presumed delay time. However, in this approach, an overhead of the guard interval increases which leads to lower transmission efficiency.

As another approach to overcome the problem, for example, the frequency equalization methods proposed by Steffen Trautmann, et al. are effective (see Patent Document 1 and Non-Patent Literature 1). In these methods, null carriers (subcarriers not power-transmitted) included in an OFDM signal are used to suppress a delay time on a time axis.

More specifically, for example, the receiver converts time signals into subcarrier signals for each of the subcarriers by removing the guard interval in a "GI Removal module" and performing FFT in a "DFT module". However, in an environment in which delayed waves that exceed the guard interval arrive, the frequency signals for each of the subcarriers are not completely orthogonal to one another and cause interference to one another.

To suppress such interference and realize the frequency equalization, an equalization matrix E needs to satisfy the following Equations (1) and (2):

$$S_{1,red}^T E S_{1,red} = D_{1,red}^{-1} \quad (1)$$

$$S_{0,red}^T E W_M C_{err}(I_3 \times i W_M S_{1,red}) = 0 \quad (2)$$

$$D_{1,red} = S_{1,red}^T D S_{1,red}$$

$$C_{err} = C - C_{cycl}$$

$$C_{cycl} = i W_M D W_M$$

In Equation (2), the variable $S_{1,red}$ represents a data signal row selection matrix; $S_{0,red}$, a null carrier row selection matrix; E, a frequency equalization matrix; D, a propagation channel frequency matrix; $W_M$, a DFT matrix; C, a propagation channel time matrix; $C_{cycl}$, a propagation channel time matrix; and $I_3$, a unit matrix of 3×3. Moreover, the superscript −1 represents an inverse matrix; the superscript T, a complex conjugate transpose; and ×, the Kronecker product.

Therefore, in the conventional receiver, a ZF standard is applied to Equations (1) and (2) and an "E-Matrix Generator module" is made to create the frequency equalization matrix E according to the following Equation (3):

$$E = S_{1,red} D_{1,red}^{-1} S_{1,red}^T - S_{1,red} D_{1,red}^{-1} W_{1,red} W_{0,red}^+ S_{0,red}^T \quad (3)$$

$$W_{1,red} = S_{1,red}^T W_M Z_{c,red}^T$$

$$W_{0,red} = S_{0,red}^T W_M Z_{c,red}^T$$

In Equation (3), the variable $Z_{c,red}$ represents an error channel row selection matrix. Moreover, the superscript + represents an MP general inverse matrix.

The frequency equalization matrix E has an effect of removing the interference due to the delayed waves using redundancy of null carriers based on the ZF (Zero Forcing) standard. Moreover, as described above, the frequency equalization matrix E can be calculated by using the known matrices $S_{1,red}$ and $S_{0,red}$, the propagation channel information $D_{1,red}$ estimated from the OFDM signal, and the error channel row selection matrix $Z_{c,red}$.

Finally, an "E-Matrix Multiplier module" obtains frequency information for each of the subcarriers, the interference due to the delayed waves on which is suppressed, by multiplying a signal output from the "DFT module" with the frequency equalization matrix E.

The conventional receiver applies an MMSE (Minimum Mean Square Error) standard to create the equalization matrix E represented by Equation (4):

$$e_{i,red} = \sigma_{ui}^2 h_{red,((d-1)N+1)} * F_{1,red}^T \cdot (F_{1,red} R_{hh} F_{1,red}^T + \sigma_r^2 F_{1,red} F_{1,red}^T)^{-1} \quad (4)$$

$$e_i = e_{i,red} Z_{i,red}$$

$$F_{1,red} = Z_{i,red} W_M$$

$$H_{red} = C(I_3 \times i W_M S_{1,red})$$

$$R_{hh} = H_{red} R_{uu} H_{red}^T$$

$e_i$ is an i-th row component of the equalization matrix E and $h_{red,((d-1)N+1)}$ is a row component of (d−1)N+i of $H_{red}$. $R_{uu}$ represents an auto-correlation function of an input signal, $Z_{i,red}$ represents an extraction matrix used for extracting a non-zero element of $e_i$, and C represents a channel matrix in a time domain.

To calculate the equalization matrix E according to the MMSE standard, it is necessary to calculate Equation (4) the number of times equal to the number of effective carriers.

Patent Document 1: International Publication No. 03/039088 Pamphlet

Non-Patent Literature 1: Steffen Trautmann and Norbert J. Fliege, "Perfect Equalization for DMT Systems Without Guard Interval", IEEE Journal on Selected Areas in Communications, vol. 20, No. 5, June 2002

DISCLOSURE OF INVENTION

Problem to be Solved by the Invention

However, the conventional radio communication system has the following problems:
(1) Because the null carrier information is used, the delayed wave interference suppression effect is not obtained under in an environment in which there is no null carrier or there are few null carriers.

(2) A method for obtaining propagation channel information and maximum delay time information is not indicated.

(3) The use of a pilot signal is conceivable to overcome the drawback described in (1). However, in the conventional radio communication system, although there is an indication concerning the use of a pilot signal, a specific method is not indicated.

(4) Noise enhancement occurs in the equalization matrix based on the ZF standard indicated by Equations (1) to (3).

(5) In calculating the equalization matrix based on the MMSE standard indicated by Equation (4), because an inverse matrix operation "number of effective subcarriers×effective subcarrier number matrix" is necessary for each of the subcarriers, the amount of arithmetic operations to be performed is extremely large.

(6) Because the conventional system can produce only a hard determination output, a soft determination output can not be obtained.

The present invention has been devised in view of the above and it is an object of the present invention to obtain a receiving apparatus that is capable of effectively suppressing interference due to delayed waves under an environment in which there is no null carrier or there is few null carriers.

Means for Solving Problem

Effect of the Invention

According to the present invention, a DFT output that can use pilot signals as null carriers is generated to obtain an effect equivalent to frequency equalization performed by using null carriers. Thus, for example, it is possible to suppress interference due to delayed waves that exceed a guard interval (a cyclic prefix).

EXPLANATIONS OF LETTERS OR NUMERALS

Figure 1:
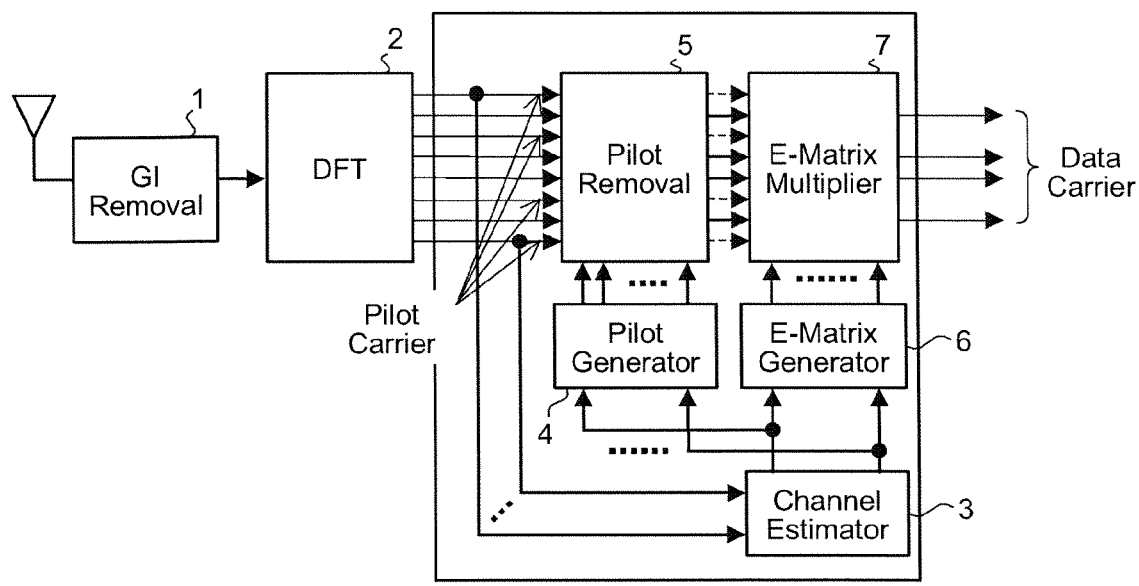
FIG. 1 is a diagram of an example of a structure of an OFDM receiving apparatus according to (a first embodiment) the present invention.

1 GIR (GI Removal) unit
2, 9b DFT (Discrete Fourier Transform) units
3, 3a CE (Channel Estimator) units
4 PG (Pilot Generator) unit
5 PR (Pilot Removal) unit
6, 6c-1, 6c-2 EMG (E-Matrix Generator) units
7 EMM (E-Matrix Multiplier) unit
8b GIR (GI2 Removal) unit
10c EMC (E-Matrix Combiner) unit
11d RG (Reliability Generator) unit
12d SOD (Soft-Output Detector) unit

BEST MODE(S) FOR CARRYING OUT THE INVENTION

Exemplary embodiments of a receiving apparatus according to the present invention are explained in detail below based on the drawings. In the embodiments, as an example, a system that employs the OFDM system has been described. However, the present invention is not limited to this. It is possible to apply the present invention to all communication systems (the DMT system, etc.) employing the multi-carrier modulation system.

First Embodiment

FIG. 1 is a diagram of an example of a structure of an OFDM receiving apparatus according to the present invention. The OFDM receiving apparatus includes a GIR (GI Removal) unit 1, a DFT (Discrete Fourier Transform) unit 2, a CE (Channel Estimator) unit 3, a PG (Pilot Generator) unit 4, a PR (Pilot Removal) unit 5, an EMG (E-Matrix Generator) unit 6, and an EMM (E-Matrix Multiplier) unit 7.

As shown in FIG. 1, in the OFDM receiving apparatus, a signal received through an antenna is input to the GIR unit 1. The GIR unit 1 removes a guard interval (GI) from the signal. The DFT unit 2 generates frequency signals for each of subcarriers by performing time/frequency conversion, such as the DFT, on the time signal after the GI removal. The CE unit 3 estimates propagation channel information (equivalent to D and C described later) and maximum delay time information (equivalent to $L_c$ described later) using the output of the DFT, calculates a propagation channel orthogonal matrix ($D_{1,red}$) based on the propagation channel information, and calculates an error channel row selection matrix ($Z_{c,red}$) based on the maximum delay time information. The PG unit 4 creates reproduced pilot signals based on the propagation channel information estimated by the CE unit 3 and the known information about the pilot. The PR unit 5 removes the reproduced pilot signals from the output of the DFT. With such processing, it is possible to remove the pilot signals from the output of the DFT thereby converting the output of the DFT to a signal in which the pilot signals can be virtually treated as null carriers.

The EMG unit 6 generates, assuming that the pilot signals are null carriers, a frequency equalization matrix E using Equation (5) based on the propagation channel information and the maximum delay time information:

$$E = S_{1,red} D_{1,red}^{-1} S_{1,red}^{T} - S_{1,red} D_{1,red}^{-1} W_{1,red} W'_{0,red}^{+} S'_{0,red}^{T} \quad (5)$$

In Equation (5), the variable $S_{1,red}$ represents a data signal selection matrix; $S'_{0,red}$, a pilot signal selection matrix; and $D_{1,red}$, a propagation channel orthogonal matrix. Moreover, the superscript $-1$ represents an inverse matrix; the superscript T, complex conjugate transpose; and the superscript +, an MP general inverse matrix.

However, as described above, $D_{1,red}$ is calculated in the CE unit 3 as indicated by Equation (6). $W_{1,red}$ and $W'_{0,red}$ are defined by following Equations (7) and (8):

$$D_{1,red} = S_{1,red}^T D S_{1,red} \quad (6)$$

$$W_{1,red} = S_{1,red}^T W_M Z_{c,red}^T \quad (7)$$

$$W'_{0,red} = S'_{0,red}^T W_M Z_{c,red}^T \quad (8)$$

In Equations (6) to (8), $Z_{c,red}$ represents an error channel row selection matrix, D represents a propagation channel frequency matrix, and WM represents a DFT matrix. The matrix $Z_{c,red}$ and the matrix D are calculated in the CE unit 3.

Finally, the EMM unit 7 multiplies the signal output from the PR unit 5 with the frequency equalization matrix E thereby generating frequency information for each of the subcarriers with suppressed interference due to the delayed waves.

Figure 2:
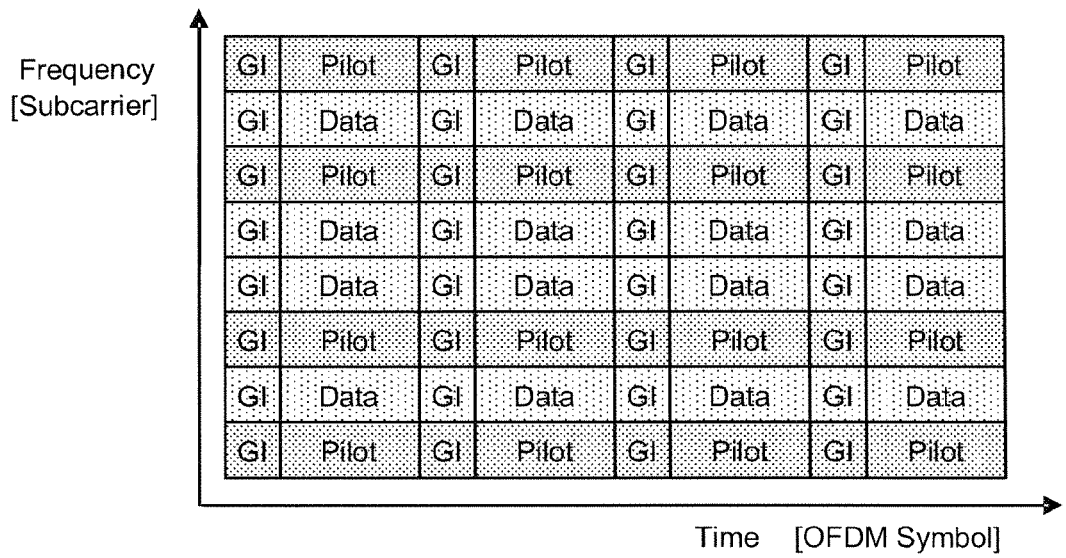
FIG. 2 is a diagram of an example of an OFDM signal assumed in the first embodiment.

The processing is explained below concretely by using an OFDM signal assumed in this embodiment. FIG. 2 is a diagram of an example of the OFDM signal. In this embodiment, as an example of OFDM signal without null carriers, subcarriers are constituted by data signals (Data) and pilot signals (Pilot). For example, when propagation channel frequency responses $d_i$ in respective subcarriers (carriers i) are obtained, the CE unit 3 removes influences of delayed waves that exceed the GI by performing averaging processing or the like on $d_i$. In this configuration, the propagation channel frequency matrix D can be represented by the following Equation (9):

[Equation 1]

$$D = \text{diag}(d_i e^{j2\pi i/M}) \quad (9)$$

where diag ($x_i$) represents a diagonal matrix having $x_i$ in a (i,i) element.

Figure 3:
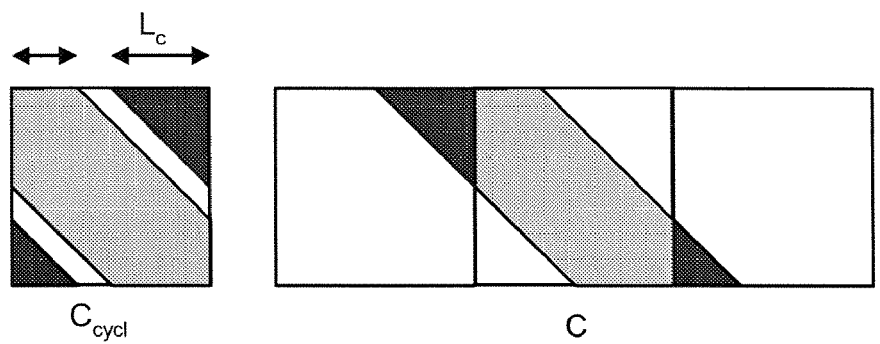
FIG. 3 is a diagram of a propagation channel time matrix C.

If the size of the DFT is M, for example, the propagation channel time matrix $C_{cycl}$ is an M×M matrix. Moreover, a propagation channel response of a delayed wave component exceeding the GI is aliased and included in $C_{cycl}$. The CE unit 3 obtains a propagation channel time matrix C without aliasing by calculating a maximum delay time $L_c$ from this matrix and expanding the maximum delay time $L_c$ into a matrix component of $C_{cycl}$. FIG. 3 is a diagram of the propagation channel time matrix C. In this case, a reproduced pilot signal $Y_p$ in the PG unit 4 can be represented as indicated by Equation (10):

[Equation 2]

$$y_p(k) = W_M CG(I_3 \times iW_M) \begin{pmatrix} p(k-1) \\ p(k) \\ p(k+1) \end{pmatrix} \quad (10)$$

In Equation (10), p(k) represents a transmission pilot signals vector at time k, and G represents a guard interval matrix.

The PR unit 5 removes the reproduced pilot signal $y_p$ from the output of the DFT. Consequently, in a later stage, it is possible to use the resultant pilot signals as null carriers.

Figure 4:
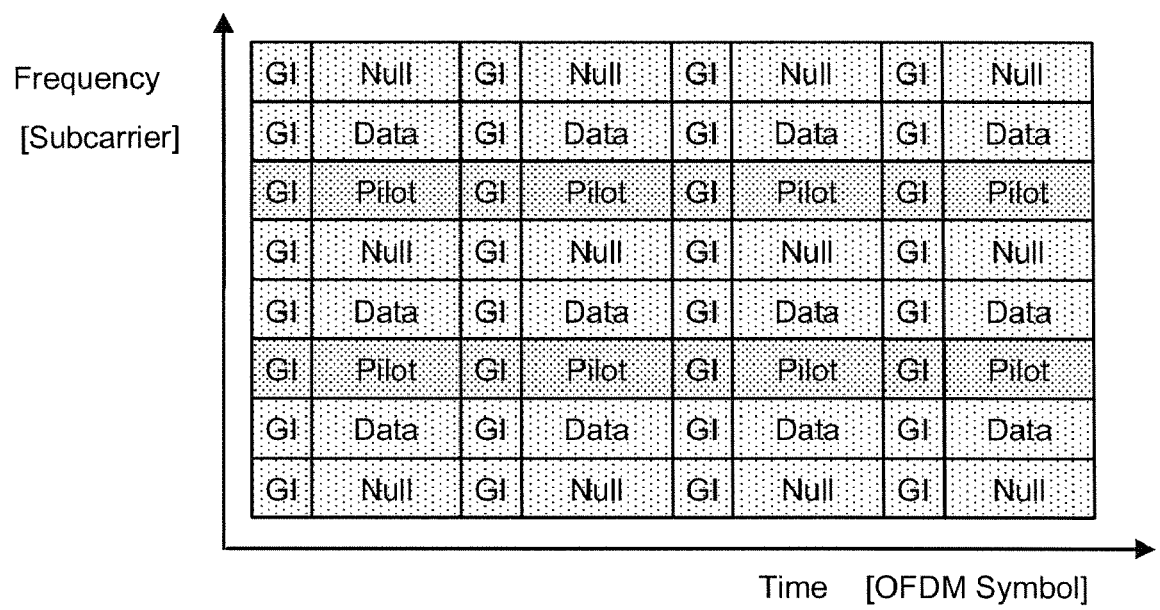
FIG. 4 is a diagram of another example of an OFDM signal assumed in the first embodiment.
Figure 5:
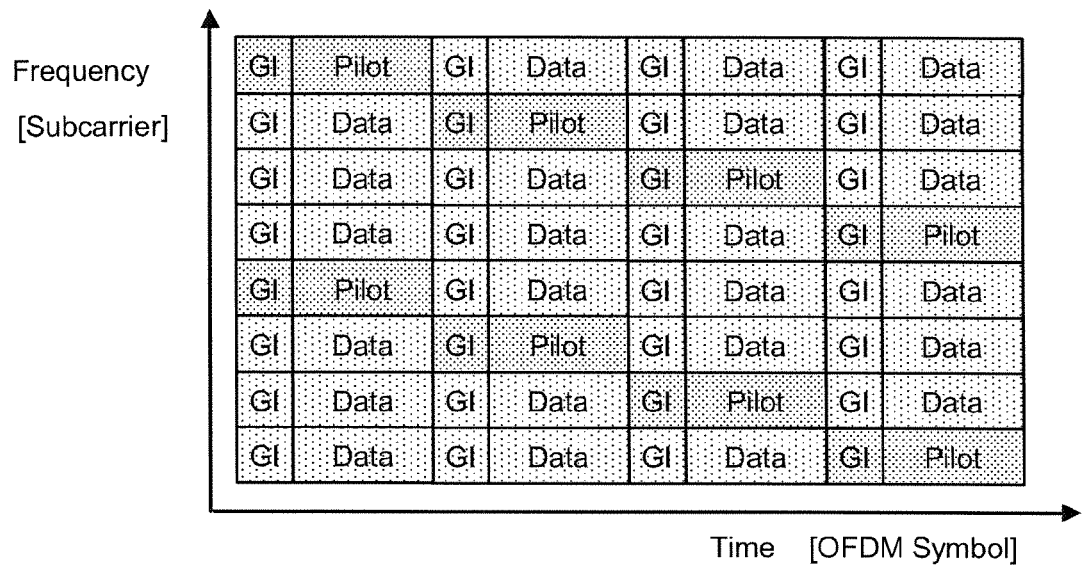
FIG. 5 is a diagram of still another example of an OFDM signal assumed in the first embodiment.

The structure of the OFDM signal is not limited to that shown in FIG. 2. In other words, the OFDM signal can have the structures shown in FIGS. 4 and 5. For example, FIG. 4 is a diagram of an example of an OFDM signal different from that shown in FIG. 2. In the OFDM signal shown in FIG. 4, subcarriers include data signals (Data), pilot signals (Pilot), and null carriers (Null). The proportion of the usable null carriers in the OFDM signal increases when the pilot signals are removed from the OFDM signal, i.e., the effect of frequency equalization enhances. FIG. 5 is a diagram of an example of an OFDM signal different from those shown in FIGS. 2 and 4. In the OFDM signal shown in FIG. 5, subcarriers include data signals (Data) and pilot signals (Pilot). However, positions of the pilot signals change for each of OFDM symbols. By using a pilot signal vector p(k) and a pilot signal selection matrix $S'_{0,red}$ corresponding to the OFDM symbols, the OFDM signal shown in FIG. 5 can be used in the structure shown in FIG. 1 without making any changes.

As described above, in this embodiment, for example, when the OFDM signal without null carriers and with pilot signals is received, by reproducing and removing the pilot signals, an output of a DFT in which the pilot signals can be used as null carriers is generated thereby achieving an effect equivalent to the frequency equalization performed by using the null carriers. Consequently, it is possible to suppress the interference due to the delayed waves that exceed the GI.

For the OFDM signal with null carriers and pilot signals, the interference due to the delayed waves that exceed the GI can be suppressed by reproducing and removing the pilot signals, i.e., by increasing the proportion of the usable null carriers.

For the OFDM signal in which positions of pilot signals change as time elapses, the interference due to the delayed waves that exceed the GI can be suppressed by reproducing and removing the time-varying pilot signals and performing frequency equalization using the time-varying null carriers.

Second Embodiment

Figure 6:
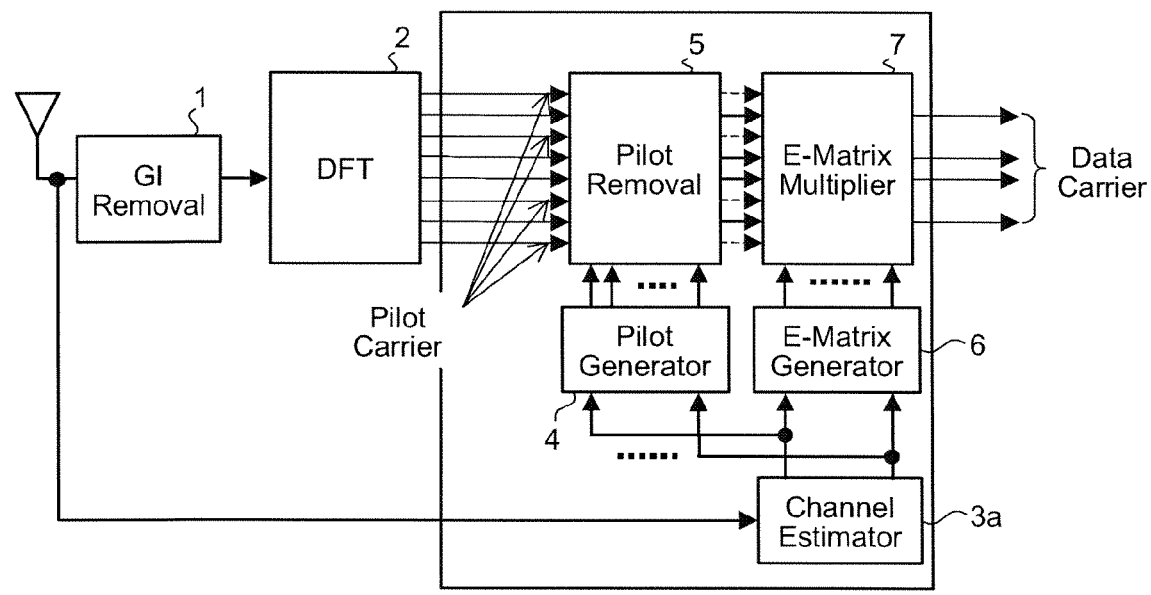
FIG. 6 is a diagram of an example of a structure of an OFDM receiving apparatus according to (a second embodiment of) the present invention.

FIG. 6 is a diagram of an example of a structure of the OFDM receiving apparatus according to the present invention. In this embodiment, instead of the CE unit 3 in the first embodiment described above, the OFDM receiver includes a CE unit 3a that estimates propagation channel information (C and D) and maximum delay time information ($L_c$) by using an output of the antenna rather than the output of the DFT, calculates a propagation channel orthogonal matrix ($D_{1,red}$) based on the propagation channel information, and calculates an error channel row selection matrix ($Z_{c,red}$) based on the maximum delay time information. Components same as those in the first embodiment are denoted by the same reference numerals/signs and explanation of such components is omitted. Here, only the CE unit 3a that performs processing different from that in the first embodiment is explained.

Figure 7:
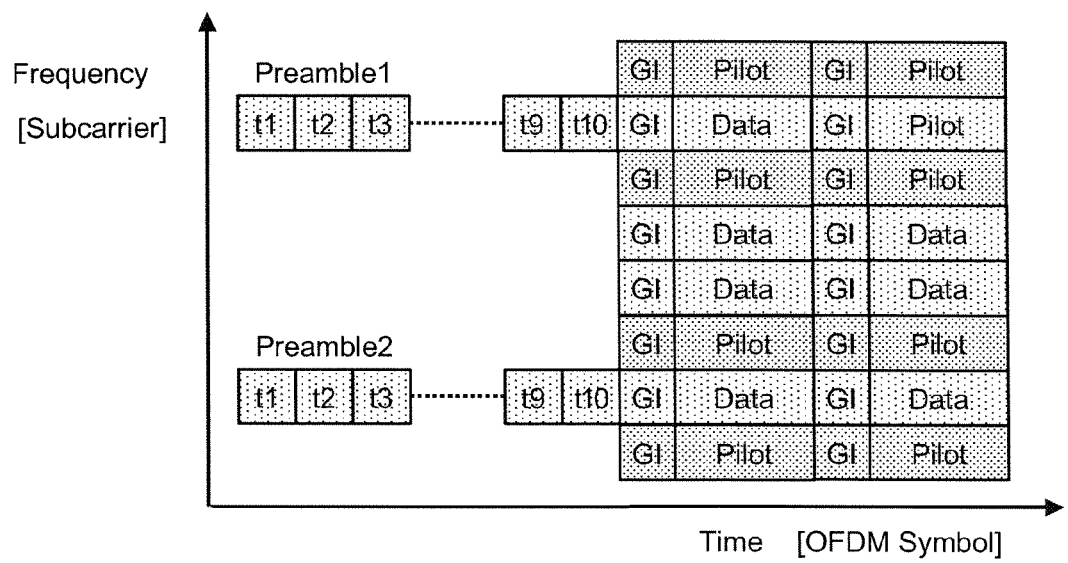
FIG. 7 is a diagram of an example of an OFDM signal assumed in the second embodiment.

FIG. 7 is a diagram of an example of an OFDM signal assumed in the second embodiment. In this embodiment, a signal obtained by combining preambles with known transmission sequences and the OFDM signal used in the first embodiment is assumed.

First, in this embodiment, the CE unit 3a estimates a propagation channel time response $c_i$ and a maximum delay time $L_c$ by correlating preamble sections (Preamble) of a reception signal and the known sequences. The propagation channel response obtained here is a signal from which noise has been suppressed in correlation processing to suppress noise. Subsequently, the CE unit 3a generates the propagation channel time matrices $C_{ycl}$ and C, which is described in the first embodiment, by transforming the propagation channel time response $c_i$ to a matrix based on the maximum delay time $L_c$. Moreover, the CE unit 3a calculates a propagation channel frequency matrix D from the following Equation (11):

$$D = W_M C_{cycl} i W_M \quad (11)$$

As described above, in this embodiment, for example, when the OFDM signal with preambles is received, the reception signal and the known sequences are correlated in a time domain. Consequently, it is possible to obtain the same effect as that in the first embodiment and obtain a more highly accurate propagation channel response.

Third Embodiment

Figure 8:
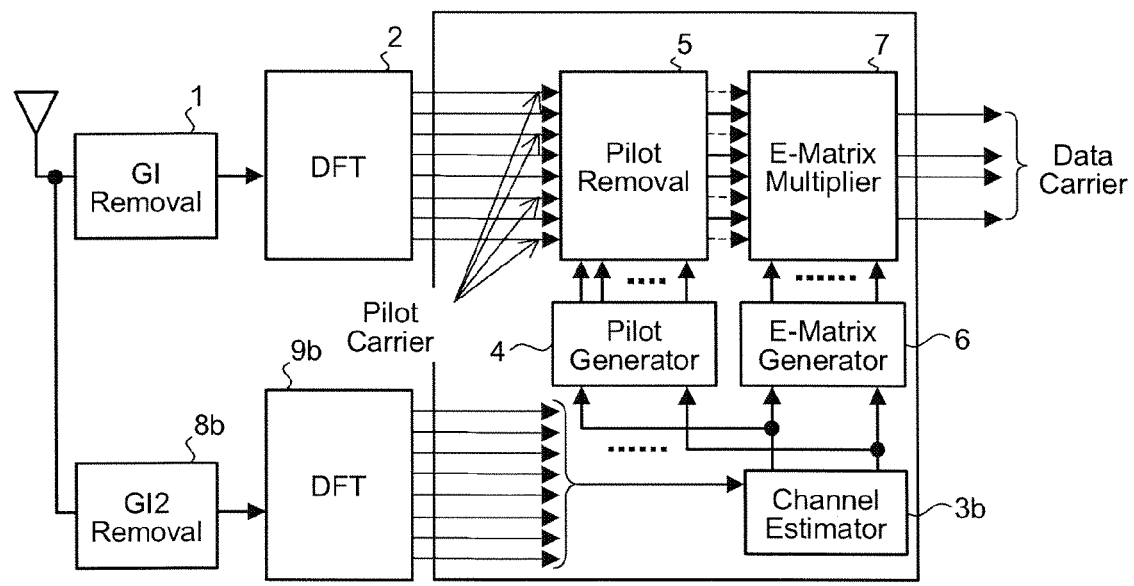
FIG. 8 is a diagram of an example of a structure of an OFDM receiving apparatus according to (a third embodiment of) the present invention.

FIG. 8 is a diagram of an example of a structure of the OFDM receiving apparatus according to the present invention. In this embodiment, in addition to the components in the first embodiment, the OFDM receiving apparatus further includes a GIR (GI2 Removal) unit 8b that removes GI2 of a guard interval length different from that of the GI processed in the GIR unit 1. Propagation channel information (C and D) and maximum delay time information ($L_c$) are estimated using an output of a DFT unit 9b, a propagation channel orthogonal matrix ($D_{1,red}$) is calculated based on the propagation channel information, and an error channel row selection matrix ($Z_{c,red}$) is calculated based on the maximum delay time information. Components same as those in the first embodiment are denoted by the same reference numerals/signs and explanation of such components is omitted. Only the GIR unit 8b and the DFT unit 9b that perform processing different from that in the first embodiment are explained in detail.

Figure 9:
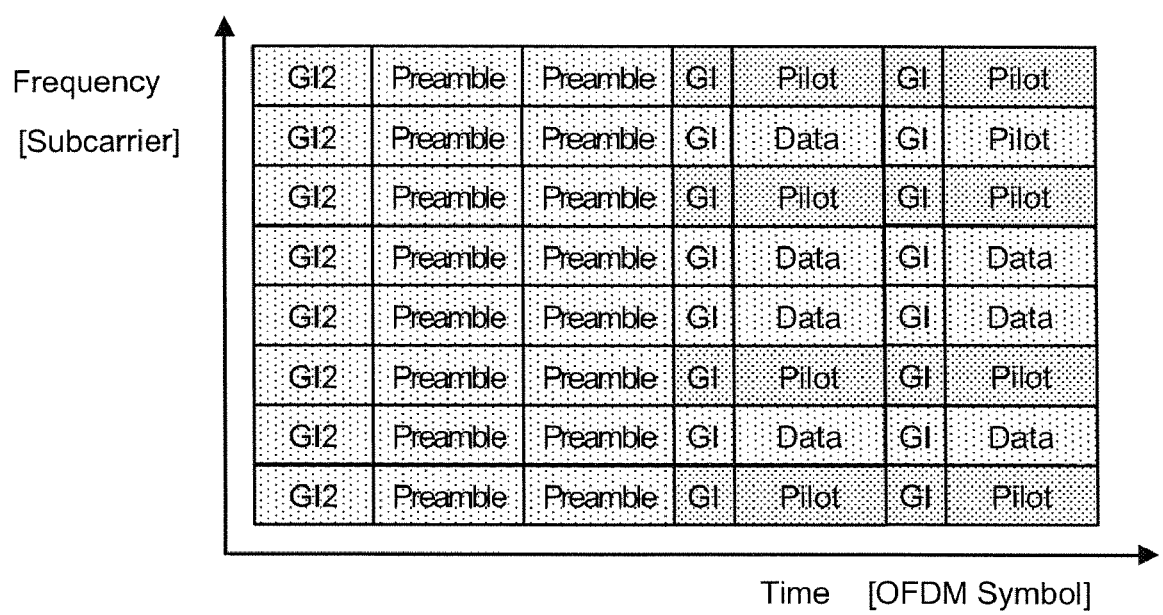
FIG. 9 is a diagram of an example of an OFDM signal assumed in the third embodiment.

FIG. 9 is a diagram of an example of an OFDM signal assumed in the third embodiment. In this embodiment, a signal obtained by combining preambles with known transmission sequences and the OFDM signal used in the first embodiment is assumed. Moreover, a guard interval (GI2) longer than a normal symbol is used as a guard interval used in the preambles. For example, in IEEE802.11a, which is one of standards of the wireless LAN, a preamble obtained by connecting the guard interval (GI2) and two data (preamble) is used as a long preamble.

In this embodiment, the GIR unit 8b removes the GI2 shown in FIG. 9 and extracts preambles. The DFT unit 9b executes DFT on the preambles, whereby a propagation channel frequency response is obtained. In this processing, because the GI2 is set longer than usual (than the GI shown in FIG. 9), for example, the delayed waves that exceed the GI can fit in the GI2. In other words, because interference due to delayed waves that exceed the GI2 is not present in an output of the DFT unit 9b, subcarriers are orthogonal to one another. Consequently, the output of the DFT unit 9b is equivalent to the propagation channel frequency response $d_i$. The CE unit 3 calculates a propagation channel frequency matrix D according to Equation (9) as in the first embodiment.

After that, $L_c$ and C are estimated by using the same method as that in the first embodiment. Because the propagation channel response obtained here is not affected by the delayed waves that exceed the guard interval, the obtained propagation channel response is highly accurate. When the preambles are repeatedly transmitted, it is possible to obtain a more highly accurate response by applying identical operation to the preambles in the latter half and averaging responses.

As described above, in this embodiment, for example, when the OFDM signal having the preambles including the guard interval of a length sufficient for preventing the interference due to the delayed waves from being present is input, DFT is performed in a frequency domain in a state in which the interference due to the delayed waves is accurately removed using the preambles. Consequently, it is possible to obtain the same effect as that in the first embodiment and obtain a more highly accurate propagation channel response.

Fourth Embodiment

Figure 10:
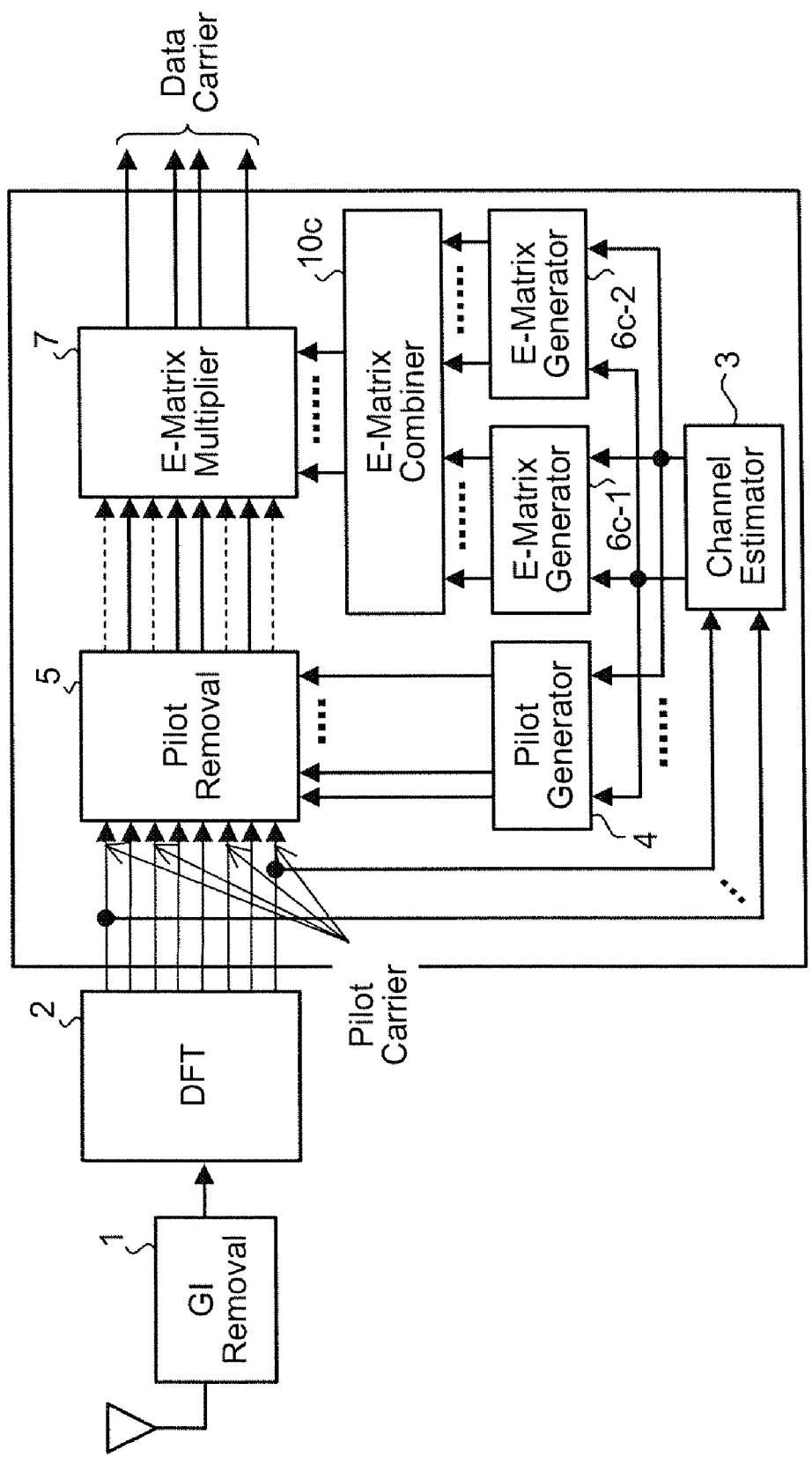
FIG. 10 is a diagram of an example of a structure of an OFDM receiving apparatus according to (a fourth embodiment of) the present invention.

FIG. 10 is a diagram of a structure of the OFDM receiving apparatus according to the present invention. In this embodiment, instead of the EMG unit 6 in the first embodiment, the OFDM receiving apparatus includes two EMG units 6c-1 and 6c-2 that generate equalization matrices and an EMC (E-Matrix Combiner) unit 10c that combines the equalization matrices. For example, the EMG unit 6c-1 applies the ZF standard to a signal equalization element less easily affected by noise and reduces an amount of arithmetic operation. On the other hand, the EMG unit 6c-2 applies the MMSE standard to an interference suppression element easily affected by noise and improves interference resistance.

Operations of the EMG units 6c-1 and 6c-2 in this embodiment are explained. First, in the calculation of an equalization matrix E, it is necessary to calculate E that satisfies Equations (1) and (2). Here, as in Equation (12), the EMG unit 6c-1 obtains an equalization matrix $E_1$ by solving Equation (1) according to the ZF standard:

$$E_1 = S_{1,red} D_{1,red}^{-1} S_{1,red}^T \tag{12}$$

Subsequently, as in Equation (13), the EMG unit 6c-2 obtains an equalization matrix $E_0$ by substituting Equation (12) in Equation (2) and solving the Equation (13) according to the MMSE standard:

[Equation 3]

$$E_0 = S_1 \frac{-2 S_0^T W_c R_{th} i W_c S_1 D^{-1T}}{2 S_0^T W_c R_{th} i W_c S_0 + \frac{M I_K}{\sigma_u^2 / \sigma_n^2}} S_0^T \tag{13}$$

In Equation (13), $W_c = W_M Z_c^T$, $C_{err} C_{err}^T = 2 Z_c^T R_{th} Z_c$, $\sigma_u^2$ indicates transmission signal power, $\sigma_n^2$ indicates noise power, and $I_K$ indicates a K×K unit matrix.

The EMC unit 10c combines an output $E_1$ of the EMG unit 6c-1 and an output $E_0$ of the EMG 6c-2 and outputs a combination result E to the EMM unit 7.

Therefore, in this embodiment, because the EMG unit 6c-1 that calculates an equalization matrix according to the ZF standard, the EMG unit 6c-2 that calculates an equalization matrix according to the MMSE standard, and the EMC unit 10c that combines both the equalization matrices are provided, a reduction in an amount of arithmetic operation and improvement of interference resistance are realized. Consequently, it is possible to realize characteristics more excellent than those in the conventional system with an amount of arithmetic operation smaller than that in the conventional system.

Fifth Embodiment

Figure 11:
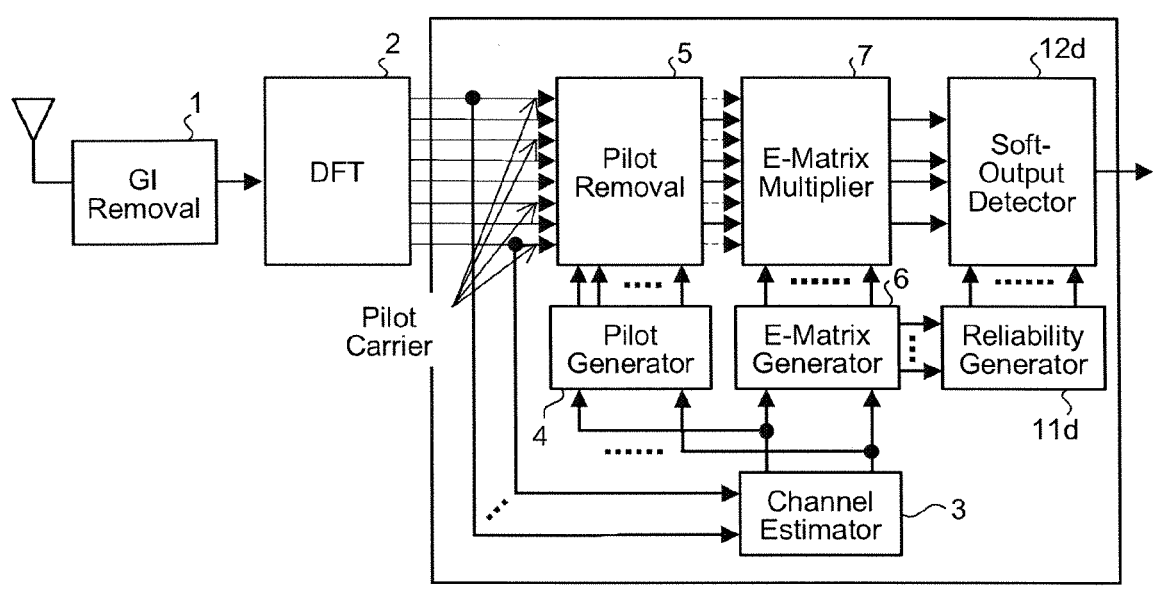
FIG. 11 is a diagram of an example of a structure of an OFDM receiving apparatus according to (a fifth embodiment of) the present invention.
Figure 12:
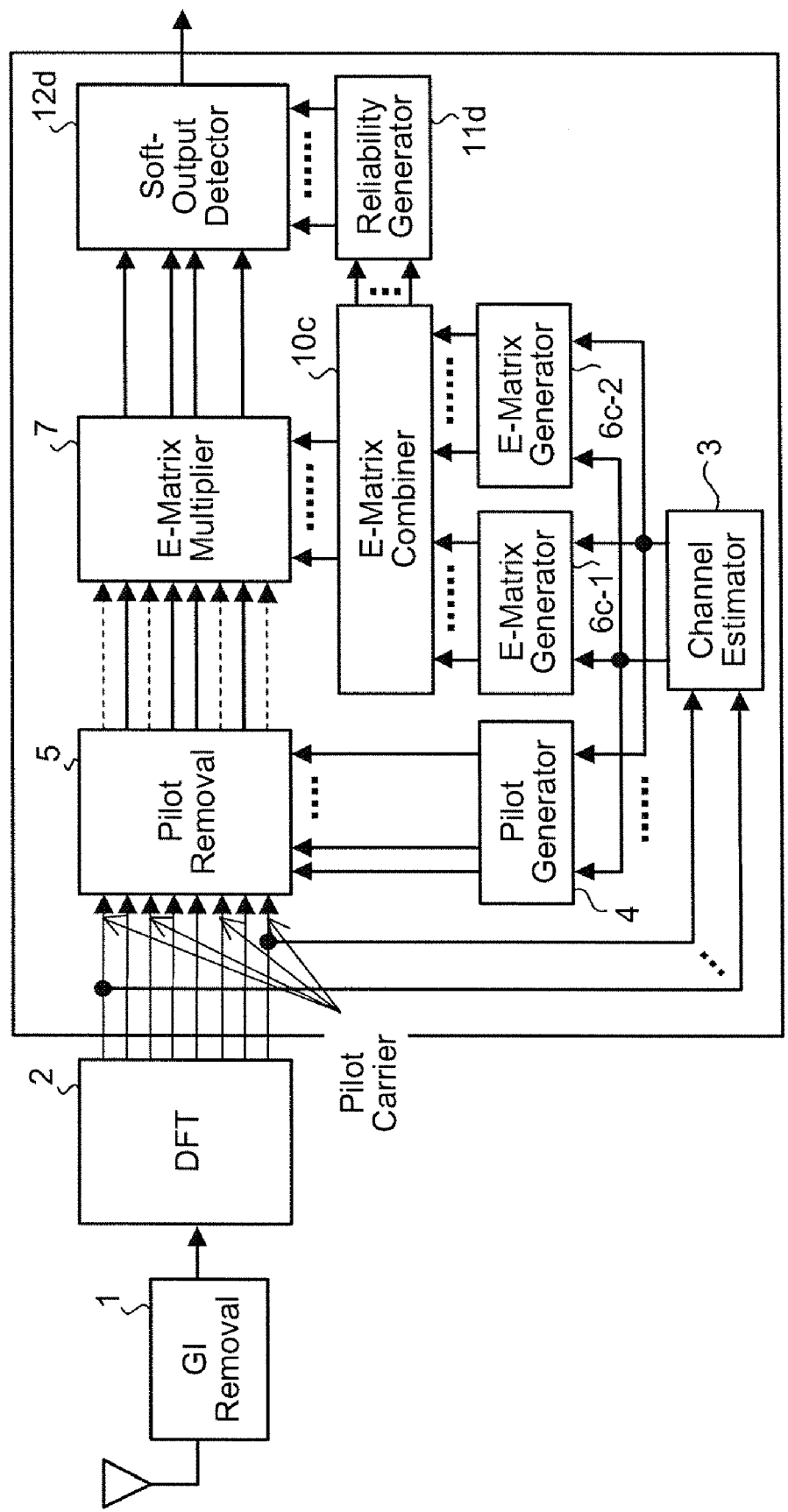
FIG. 12 is a diagram of an example of a structure of an OFDM receiving apparatus according to (the fifth embodiment of) the present invention.

FIG. 11 is a diagram of a structure of the OFDM receiving apparatus according to the present invention. More specifically, FIG. 11 is an example of a structure of the OFDM receiving apparatus in which characteristic processing of this embodiment is applied to the structure of the first embodiment. FIG. 12 is an example of a structure of the OFDM receiving apparatus in which the characteristic processing of this embodiment is applied to the structure of the fourth embodiment.

For example, in addition to the components in the first to the fourth embodiments, the OFDM receiving apparatus according to this embodiment further includes an RG (Reliability Generator) unit $11d$ and an SOD (Soft-Output Detector) unit $12d$. The RG unit $11d$ outputs reliability of respective subcarriers based on an equalization matrix E output from the EMG unit 6 or the EMC unit $10c$. The SOD unit $12d$ generates a soft determination value using an output of the EMM unit 7 and outputs a soft determination value obtained by multiplying the soft determination value with the reliability output from the RG unit $11d$.

Operations of the RG unit $11d$ are explained below. Usually, it is possible to calculate reliability information in the soft determination value from the difference between signal point-to-point distances of a reception signal and a replica. However, when the first to the fourth embodiments are used, because the reception signal is converted by the equalization matrix E, the SOD unit $12d$ cannot obtain the reliability information correctly. Thus, the RG unit $11d$ separately generates reliability.

An example of generation of reliability information Rel is indicated by the following Equation (14):

$$\text{Rel} = \text{diag}(S_{1,red}^{T} E S_{1,red})^{-2} \qquad (14)$$

In Equation (14), an inverse of electric power of a signal equalization element as a diagonal element of the equalization matrix E is set as the reliability information. In other words, it is possible to easily derive this reliability information.

Another example of generation of the reliability information Rel is indicated by the following Equation (15):

$$\text{Rel} = S_{1,red}^{T} \{1 - E\text{diag}(D)\}^{-1} \qquad (15)$$

Equation (15) represents an SNR after equalization when transmission signal power is set to 1. Therefore, the reliability obtained from Equation (15) is more accurate than that obtained from Equation (14) in the sense that the SNR after equalization is used as reliability.

The SOD unit $12d$ multiplies a soft determination value for each of bits determined for each of the subcarriers with reliability information for each of the subcarriers output from the RG unit $11d$ and outputs a soft determination value for each of the bits.

As described above, in this embodiment, the RG unit $11d$ outputs the reliability of the respective subcarriers based on the equalization matrix E. The SOD unit 12 generates the soft determination value using the frequency information for each of the subcarriers, the interference due to the delayed waves on which is suppressed, and outputs the soft determination value obtained by multiplying the soft determination value with the reliability for each of the subcarriers. Consequently, it is possible to obtain a receiving apparatus that is capable of outputting the soft determination value.

INDUSTRIAL APPLICABILITY

As described above, the receiving apparatus according to the present invention is useful for the radio communication system employing the multi-carrier modulation system. In particular, the receiving apparatus is suitable because it suppresses interference due to delayed waves under an environment in which there is no null carrier or there are few null carriers.

The invention claimed is:

1. A receiving apparatus in a radio communication system, the apparatus comprising:
    a guard interval removing unit that removes a guard interval from a reception signal to reduce an influence due to delayed waves, and outputs an interval signal;
    a Discrete Fourier Transform (DFT) unit that applies a fourier transform to the interval signal, and outputs a fourier signal;
    a channel estimating unit that estimates a propagation channel based on the fourier signal or the reception signal to obtain channel information;
    a pilot reproducing unit that reproduces a pilot signal included in the reception signal based on information on the channel information;
    a matrix generating unit that generates, by using the pilot signal as a null carrier, a frequency equalization matrix for realizing frequency equalization based on the channel information;
    a subtracting unit that subtracts the reproduced pilot signal from the fourier signal to obtain a subtraction-result signal; and
    a matrix multiplying unit that multiplies the frequency equalization matrix with the subtraction-result signal to obtain a resultant frequency equalization matrix.

2. The receiving apparatus according to claim 1, wherein the channel estimating unit estimates a propagation channel based on a reception signal in a frequency domain after the DFT.

3. The receiving apparatus according to claim 1, wherein the channel estimating unit estimates a propagation channel based on a preamble with known transmission sequences included in a reception signal in a time domain before the DFT.

4. The receiving apparatus according to claim 1, further comprising: a reliability generating unit that generates reliability for a subcarrier based on the frequency equalization matrix; and a soft-determination-value outputting unit that generates a first soft-determination value for the subcarrier by using the resultant frequency equalization matrix and outputs a second soft-determination value as a result obtained by multiplying the first soft-determination value with the reliability.

5. The receiving apparatus according to claim 3, further comprising:
    a reliability generating unit that generates reliability for a subcarrier based on the frequency equalization matrix or the resultant frequency equalization matrix; and
    a soft-determination-value outputting unit that generates a first soft-determination value for the subcarrier by using the resultant frequency equalization matrix and outputs a second soft-determination value as a result obtained by multiplying the first soft-determination value with the reliability.

* * * * *